United States Patent
Kern et al.

(10) Patent No.: US 10,110,625 B2
(45) Date of Patent: Oct. 23, 2018

(54) NETWORK SECURITY ASSESSMENT SYSTEM

(71) Applicant: Bank of America Corporation, Charlotte, NC (US)

(72) Inventors: Daniel C. Kern, Charlotte, NC (US); Adam Z. Sun, New York City, NY (US)

(73) Assignee: Bank of America Corporation, Charlotte, NC (US)

( * ) Notice: Subject to any disclaimer, the term of this patent is extended or adjusted under 35 U.S.C. 154(b) by 98 days.

(21) Appl. No.: 14/958,486

(22) Filed: Dec. 3, 2015

(65) Prior Publication Data

US 2017/0163678 A1      Jun. 8, 2017

(51) Int. Cl.
    *H04L 29/06*       (2006.01)
(52) U.S. Cl.
    CPC ...... *H04L 63/1441* (2013.01); *H04L 63/1408* (2013.01); *H04L 63/20* (2013.01)
(58) Field of Classification Search
    CPC ................. G06F 21/55; G06F 11/3003; G06F 2009/45591; G06F 9/45533; H04L 63/1408; H04L 43/16; H04L 61/1511; H04L 41/0636; H04L 41/145
    See application file for complete search history.

(56) References Cited

U.S. PATENT DOCUMENTS

| | | | |
|---|---|---|---|
| 7,272,817 B1 | 9/2007 | Hinkle et al. | |
| 7,971,181 B2 | 6/2011 | Pabalate et al. | |
| 8,196,207 B2 | 6/2012 | Hill et al. | |
| 8,751,436 B2 | 6/2014 | Lowry et al. | |
| 2002/0161763 A1* | 10/2002 | Ye | G06F 21/55 |
| 2010/0223499 A1* | 9/2010 | Panigrahy | G06F 11/0709 714/19 |
| 2014/0108652 A1* | 4/2014 | Richard | G06F 21/55 709/224 |
| 2015/0127789 A1* | 5/2015 | Lissack | H04L 41/5022 709/221 |

* cited by examiner

*Primary Examiner* — Ghazal B Shehni
(74) *Attorney, Agent, or Firm* — Michael A. Springs

(57) ABSTRACT

A network security assessment apparatus includes a memory and a processor. The memory stores first, second, and third values of a metric. The metric indicates one or more of a number of network security breaches and a number of fraudulent transactions. The processor chronologically orders the first, second, and third values for the metric over a period of time and compares the first, second, and third values against a threshold to produce first, second, and third results. If the first result is different from the second result or if the second result is different from the third result, the processor increments a volatility count. The processor determines, based on the volatility count, that a control should be implemented to mitigate one or more of the number of network security breaches and the number of fraudulent transactions and in response to that determination, the processor implements the control.

18 Claims, 3 Drawing Sheets

NETWORK SECURITY ASSESSMENT SYSTEM

TECHNICAL FIELD

This disclosure relates generally to a system for assessing network security.

BACKGROUND

The security of a network may be threatened in various ways. For example, the network may be exposed to malware, viruses, malicious intrusions, hacks, etc. which may threaten the security of the network and the security of other nodes on the network. Therefore, maintaining the security of a network is important to the functioning of the network.

SUMMARY OF THE DISCLOSURE

According to one embodiment, a network security assessment apparatus includes a memory and a processor. The memory stores first, second, and third values of a metric. The metric indicates one or more of a number of network security breaches and a number of fraudulent transactions. The processor chronologically orders the first, second, and third values for the metric over a period of time and compares the first, second, and third values against a threshold to produce first, second, and third results. If the first result is different from the second result or if the second result is different from the third result, the processor increments a volatility count. The processor determines, based on the volatility count, that a control should be implemented to mitigate one or more of the number of network security breaches and the number of fraudulent transactions and in response to that determination, the processor implements the control.

According to another embodiment, a method includes storing a first, second, and third values for a metric. The metric indicates one or more of a number of network security breaches and a number of fraudulent transactions. The method also includes chronologically ordering the first, second, and third values for the metric over a period of time and comparing the first, second, and third values against a threshold to produce first, second, and third results. If the first result is different from the second result or if the second result is different from the third result, the method includes incrementing a volatility count. The method also includes determining, based on the volatility count, that a control should be implemented to mitigate one or more of the number of network security breaches and the number of fraudulent transactions and in response to that determination, implementing the control.

According to another embodiment, one or more computer-readable non-transitory storage media embodies software that is operable when executed to store first, second, and third values for a metric. The metric indicates one or more of a number of network security breaches and a number of fraudulent transactions. The software is also operable when executed to chronologically order the first, second, and third values for the metric over a period of time and to compare the first, second, and third values against a threshold to produce first, second, and third results. If the first result is different from the second result or if the second result is different from the third result, the software is operable when executed to increment a volatility count. The software is also operable when executed to determine, based on the volatility count, that a control should be implemented to mitigate one or more of the number of network security breaches and the number of fraudulent transactions and in response to that determination, implement the control.

Certain embodiments may provide one or more technical advantages. For example, an embodiment may improve network security by implementing controls that mitigate the number of network security breaches. As another example, an embodiment may reduce the number of fraudulent transactions by implementing controls that mitigate the number of fraudulent transactions. Certain embodiments may include none, some, or all of the above technical advantages. One or more other technical advantages may be readily apparent to one skilled in the art from the figures, descriptions, and claims included herein.

BRIEF DESCRIPTION OF THE DRAWINGS

For a more complete understanding of the present disclosure, reference is now made to the following description, taken in conjunction with the accompanying drawings, in which.

DETAILED DESCRIPTION

Figure 1:
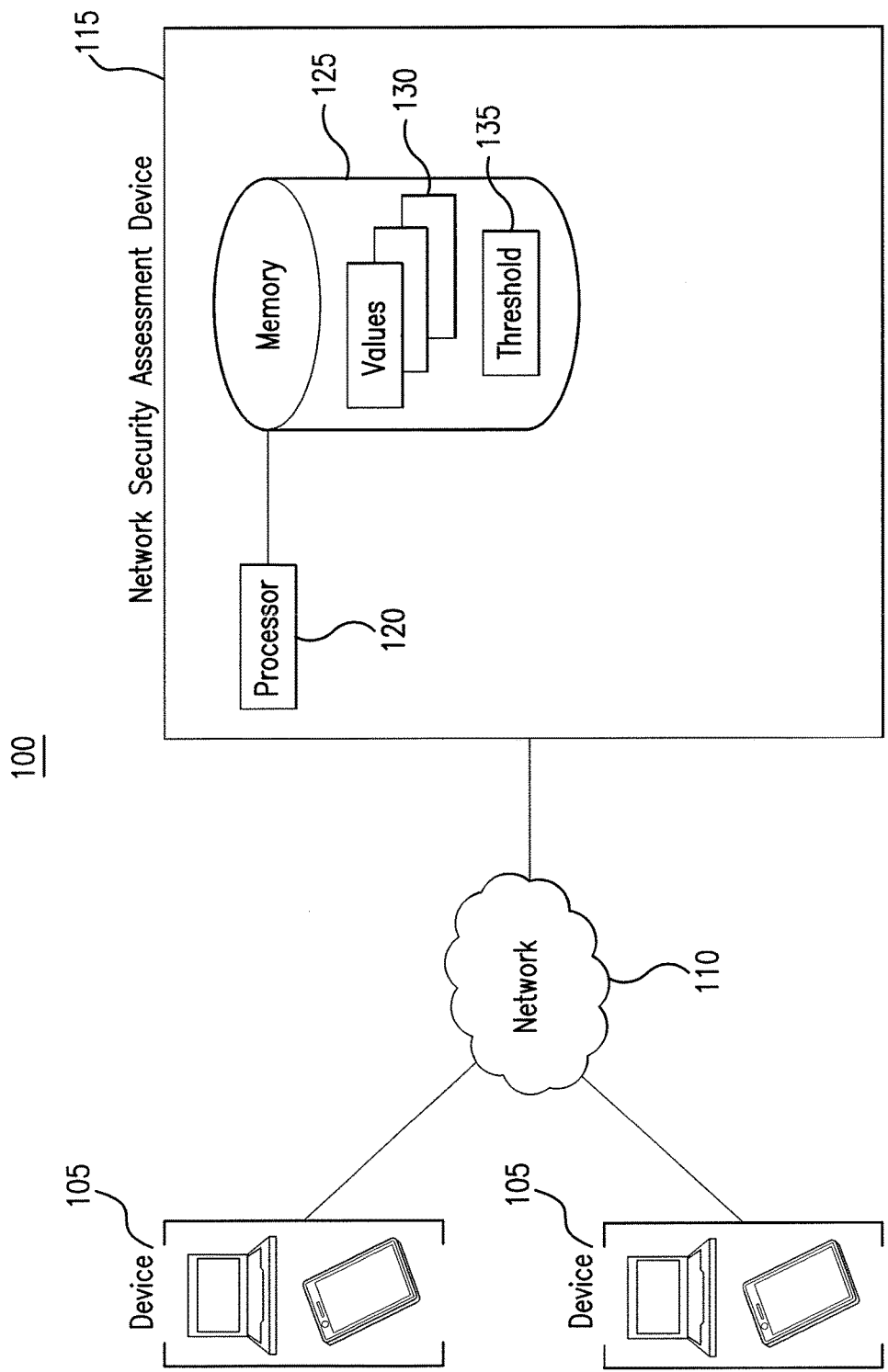
FIG. 1 illustrates a system for assessing network security.
Figure 2:
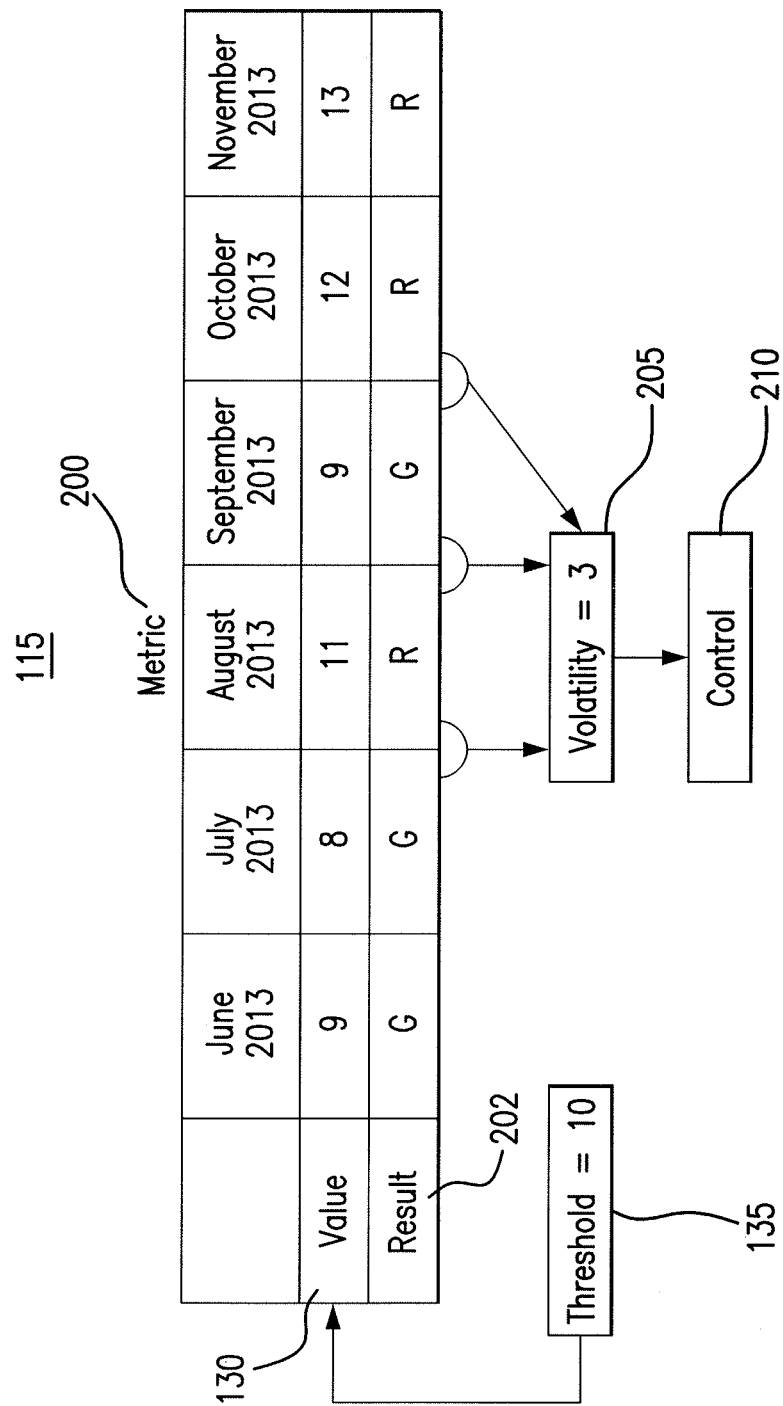
FIG. 2 illustrates the network security assessment device of FIG. 1 assessing network security.
Figure 3:
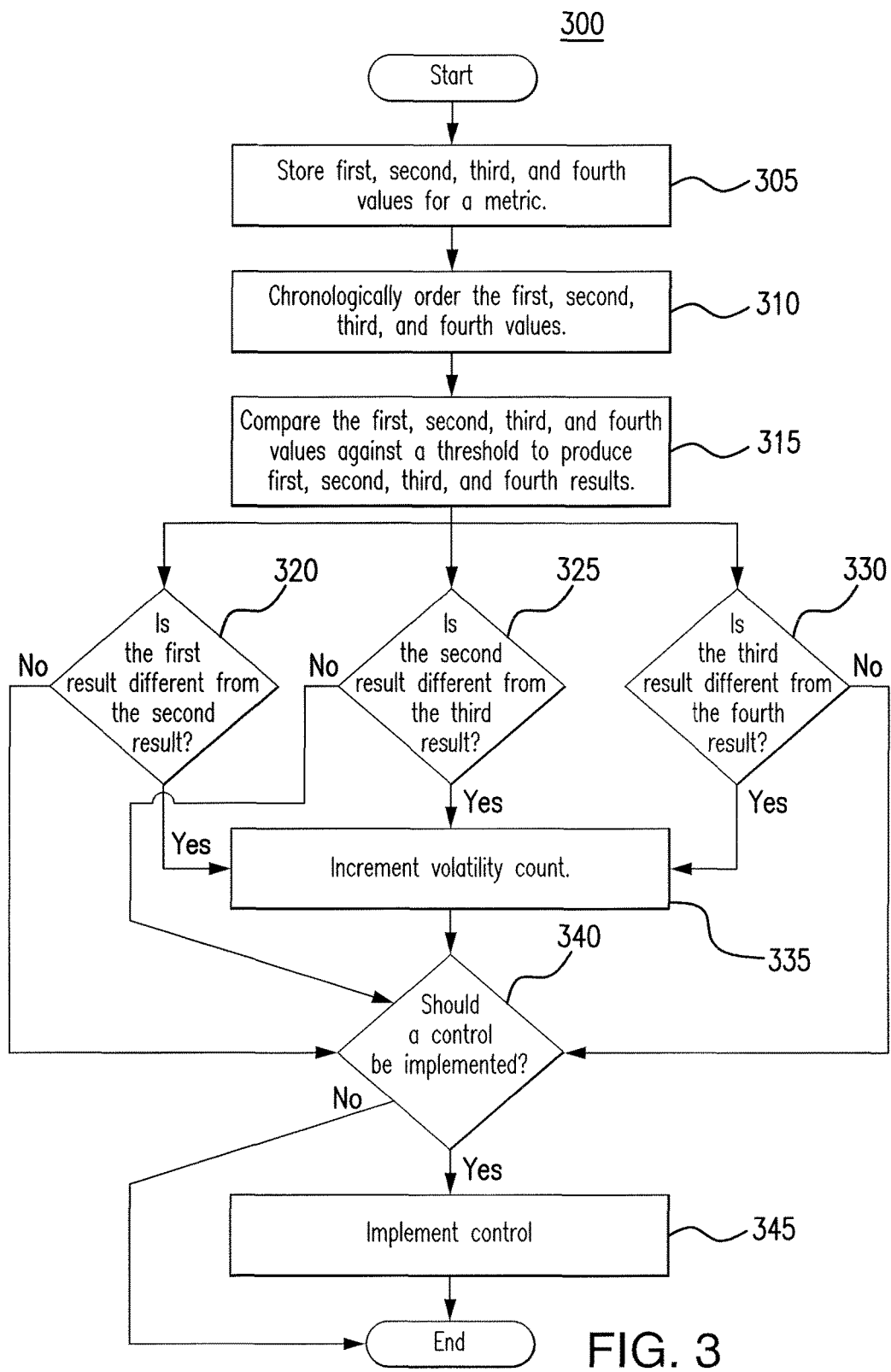
FIG. 3 is a flowchart illustrating a method for assessing network security using the system of FIG. 1.

Embodiments of the present disclosure and its advantages are best understood by referring to FIGS. 1 through 3 of the drawings, like numerals being used for like and corresponding parts of the various drawings.

The security of a computer network is important to the functioning of the network. If a network is not secure, then any number of types of intrusions and/or malware may jeopardize the core functionality of the network or any user device on the network. Therefore, maintaining the security of the network is a problem inherent to computer networks such as the Internet and is important to the functioning of the network itself.

It is important to assess the security of the network in order to maintain the security of the network. One way to assess the security of the network is to evaluate various metrics associated with network security. For example, assessing network security may involve evaluating the number of security breaches over a period of time or the number of fraudulent transactions that have occurred over a period of time. However, as networks grow larger and as they operate for longer periods of time, the number of records for any metric may become numerous, making evaluation difficult. Furthermore, it becomes difficult to contextualize the various metrics within the network. For example, it may not be possible to determine what changes and/or processes have been implemented on the network that may have caused various metrics to have changed values. Moreover, it may be difficult to evaluate trends that occur in any particular metric.

This disclosure contemplates a system for assessing network security. The system evaluates trends in particular metrics over time, and based on those trends, determines any steps that should be taken to maintain and/or improve network security. For example, the system compares the values of a metric against a threshold. Based on those comparisons, the system can determine whether network security has been improving and/or worsening. Furthermore, based on those comparisons the system can determine the volatility of a metric. For example, the system can determine how often the metric changes between being above the threshold and being below the threshold. The volatility of the metric may indicate that certain factors affecting network security should be examined further. For example, if the number of security breaches fluctuates between being above the threshold and being below the threshold from month to month, it may indicate that a control should be implemented to mitigate the number of security breaches. As another example, the volatility may indicate that a process designed to reduce the number of security breaches should be redesigned. As yet another example, the volatility may indicate that the threshold should be changed.

By using the system, network security may be maintained and/or improved. For example, the system may determine when a control should be implemented to mitigate the number of security breaches and/or fraudulent transactions. As another example, the system may determine when a process designed to mitigate the number of security breaches should be redesigned. As yet another example, the system may determine when a threshold associated with fraudulent transactions should be set to a different level. In this manner, the system may improve and/or maintain the security of the network. The system will be described in more detail using FIGS. 1 through 3. FIG. 1 presents a general overview of the system. FIG. 2 describes the operation of the system. FIG. 3 is a flowchart illustrating the operation of the system.

FIG. 1 illustrates a system 100 for assessing network security. As illustrated in FIG. 1, system 100 includes one or more devices 105, a network 110, and a network security assessment device 115. In particular embodiments, system 100 improves and/or maintains network security by analyzing various metrics and implementing controls to mitigate threats to network security based on that analysis.

Device 105 communicates with other components of system 100. For example, device 105 may communicate with network security assessment device 115 or another device 105 over network 110. Device 105 may execute software applications. During execution the application may have device 105 communicate with other devices 105 in system 100. If the application presents a risk to the security of device 105, then executing that application may present a risk to the rest of system 100. For example, the application may create an entry point for hackers and/or malware.

This disclosure contemplates device 105 being any appropriate device that can communicate over network 110. For example, device 105 may be a computer, a laptop, a wireless or cellular telephone, an electronic notebook, a personal digital assistant, a tablet, a server, a mainframe, or any other device capable of receiving, processing, storing, and/or communicating information with other components of system 100. Device 105 may also include a user interface, such as a display, a microphone, keypad, or other appropriate terminal equipment usable by a user. In some embodiments, an application executed by device 105 may perform the functions described herein.

Network 110 facilitates communication between and amongst components of system 100. This disclosure contemplates network 110 being any suitable network operable to facilitate communication between the components of system 100. Network 110 may include any interconnecting system capable of transmitting audio, video, signals, data, messages, or any combination of the preceding. Network 110 may include all or a portion of a public switched telephone network (PSTN), a public or private data network, a local area network (LAN), a metropolitan area network (MAN), a wide area network (WAN), a local, regional, or global communication or computer network, such as the Internet, a wireline or wireless network, an enterprise intranet, or any other suitable communication link, including combinations thereof, operable to facilitate communication between the components.

Network security assessment device 115 may be used to assess the security of network 110. As illustrated in FIG. 1, network security assessment device 115 includes a processor 120 and a memory 125. Processor 120 is communicatively coupled to memory 125. This disclosure contemplates processor 120 and memory 125 being configured to perform any of the functions of network security assessment device 115 described herein.

Processor 120 executes software stored on memory 125 to perform any of the functions described herein. Processor 120 controls the operation and administration of network security assessment device 115 by processing information received from network 110, device(s) 105, and memory 125. Processor 120 includes any hardware and/or software that operates to control and process information. Processor 120 may be a programmable logic device, a microcontroller, a microprocessor, any suitable processing device, or any suitable combination of the preceding.

Memory 125 stores, either permanently or temporarily, data, operational software, or other information for processor 120. Memory 125 include any one or a combination of volatile or non-volatile local or remote devices suitable for storing information. For example, memory 125 may include random access memory (RAM), read only memory (ROM), magnetic storage devices, optical storage devices, or any other suitable information storage device or a combination of these devices. The software represents any suitable set of instructions, logic, or code embodied in a computer-readable storage medium. For example, the software may be embodied in memory 125, a disk, a CD, or a flash drive. In particular embodiments, the software may include an application executable by processor 120 to perform one or more of the functions described herein.

Network security assessment device 115 may be used to assess the security of network 110. To assess the security of network 110, network security assessment device 115 stores values 130 of one or more metrics. The metrics may be any measure used to assess the security of network 110. For example, one metric may be the number of security breaches over a period of time. As another example, a metric may be the number of fraudulent transactions that have occurred over a period of time. This disclosure contemplates network security assessment device 115 storing values 130 for any appropriate metric. Values 130 may indicate measurements of a particular metric. For example, values 130 may indicate the number of security breaches over a period of time. As another example, values 130 may indicate the number of fraudulent transactions of a period of time.

As network 110 grows larger and as network 110 operates for a longer period of time, network security assessment device 115 may store an increasing number of values 130 for the metrics. Due to the large and/or increasing number of values 130, it may become more difficult to assess the security of network 110. To alleviate some of that difficulty, network security assessment device 115 may determine trends in values 130 that may be used to assess the security of network 110. For example, network security assessment device 115 may compare values 130 to a threshold 135. Based on that comparison, network security assessment device 115 may determine trends such as proportionality and/or volatility of particular metrics. Then based on the determined proportionality and/or volatility, network security assessment device 115 may determine a course of action to improve and/or maintain the security of network 110.

Threshold 135 indicates an acceptable level of performance for a metric. This disclosure contemplates network security assessment device 115 storing a threshold 135 for each metric. Network security assessment device 115 compares each stored value 130 against threshold 135 to determine if the value 130 is acceptable. For example, if a metric measures the number of security breaches in a month and the threshold 135 is eight, then that means an acceptable level of security breaches in a month is set to eight. If in any month the number of security breaches exceeds eight, then network security assessment device 115 may mark that month as having an unacceptable number of security breaches.

Network security assessment device 115 determines trends in the stored values 130 as they are compared to threshold 135. For example, network security assessment device 115 may determine a volatility of a metric by determining the number of times that the values 130 for the metric fluctuates between acceptable and unacceptable levels over a period of time. As another example, network security assessment device 115 may determine a proportionality of the stored values 130 for the metric. Network security assessment device 115 may determine the percentage of values 130 for a metric that are acceptable versus the total number of values 130 for that metric.

Based on the determined trends, network security assessment device 115 may determine a course of action to improve and/or maintain the security of network 110. For example, based on the determined volatility, network security assessment device 115 may determine that a control process should be implemented to mitigate the number of security breaches. In response, network security assessment device 115 may implement the controls, such as for example, implementing a firewall and/or implementing a network filter. As another example, in response to the volatility, network security assessment device 115 may determine that threshold 135 should be set to a different value. In response to that determination, network security assessment device 115 may set threshold 135 to a different value. As another example, based on the determined volatility, network security assessment device 115 may determine that a process implemented to mitigate network security breaches and/or fraudulent transactions should be redesigned. In response to that determination, network security assessment device 115 may redesign that process.

In particular embodiments, by using system 100 the security of network 110 may be maintained and/or improved, such as for example, by implementing controls and processes that mitigate the number of network security breaches and/or fraudulent transactions. The operation of system 100 will be discussed in more detail using FIG. 2.

Modifications, additions, or omissions may be made to system 100 without departing from the scope of the invention. For example, network security assessment device 115 may be a distributed device. As another example, the components of system 100 may be integrated or separated. For example, network security assessment device 115 may be incorporated into any of one or more devices 105. Furthermore, system 100 may include any number of devices 105.

FIG. 2 illustrates the network security assessment device 115 of FIG. 1 assessing network security. For clarity, certain elements of network security assessment device 115 have not been illustrated. Their omission from FIG. 2 however should not be construed as their removal from network security assessment device 115.

Network security assessment device 115 may store a plurality of values 130 for a metric 200. For example, metric 200 may measure the number of security breaches over a period of time. As another example, metric 200 may measure the number of fraudulent transactions that have occurred over a period of time. In the illustrated example of FIG. 2, network security assessment device 115 stores values 130 from June 2013 through November 2013. In June 2013, value 130 is nine. In July 2013, value 130 is eight. In August 2013, value 130 is eleven. In September 2013, value 130 is nine. In October 2013, value 130 is twelve. In November 2013, value 130 is thirteen. Each of these values 130 may indicate the value 130 for metric 200 during the particular month associated with the value 130. For example, if value 130 is for metric 200 that measure the number of security breaches, then value 130 for July 2013 may indicate that eight security breaches occurred in July of 2013. As another example, if value 130 is for metric 200 that measures the number of fraudulent transactions, then value 130 for August 2013 may indicate that eleven fraudulent transactions occurred in August 2013.

Network security assessment device 115 may store threshold 135 and compare threshold 135 against values 130. In the illustrated example of FIG. 2, threshold 135 is set to ten. This disclosure contemplates threshold 135 being set to any appropriate value. Threshold 135 may indicate an acceptable level for metric 200. For example, if metric 200 measures the number of security breaches over a period of time, then threshold 135 may indicate that ten security breaches in one month is an acceptable number of security breaches in a month. If metric 200 measures the number of fraudulent transactions in a month, then threshold 135 may indicate that ten fraudulent transactions is an acceptable number of fraudulent transactions in a month.

By comparing threshold 135 to each of values 130, network security assessment device 115 may determine one or more results 202. Each result 202 may indicate whether a corresponding value 130 was above or below threshold 135. In the illustrated example of FIG. 2, each result 202 is further associated with a color to indicate whether the corresponding value 130 is above or below threshold 135. As shown, result 202 is green if the corresponding value 130 is below threshold 135 and result 202 is red if the corresponding value 130 is above threshold 135. This disclosure contemplates result 202 being associated with any appropriate indicator that indicates whether a corresponding value 130 is above or below threshold 135. For example, result 202 could be associated with check marks and Xs and/or pass/fail designations. As illustrated, in June 2013, result 202 is green. In July 2013, result 202 is green. In August 2013, result 202 is red. In September 2013, result 202 is green. In October 2013, result 202 is red. In November 2013, result 202 is red.

Network security assessment device 115 may examine results 202 to determine a volatility 205. Volatility 205 may indicate how often result 202 changes. In the illustrated example of FIG. 2, result 202 changes between July 2013 and August 2013, between August 2013 and September 2013, and between September 2013 and October 2013. As a result, volatility 205 is three because result 202 changed three times from June 2013 through November 2013.

Based on volatility 205, network security assessment device 115 may take any appropriate action. For example, based on volatility 205 network security assessment device 115 may determine that a control 210 should be implemented to maintain and/or improve the security of network 110. For example, network security assessment device 115 may determine that control 210 should be implemented to mitigate the number of security breaches. As another example, network security assessment device 115 may determine that control 210 should be implemented to mitigate the number of fraudulent transactions.

In particular embodiments, network security assessment device 115 determines based on volatility 205 that threshold 135 should be set to a different value. For example, network security assessment device 115 may determine that threshold 135 was changed in July 2013. Based on that determination and the determination that result 202 started changing from July 2013 through October 2013, network security assessment device 115 determines that threshold 135 was improperly set. As a result, network security assessment device 115 determines that threshold 135 should be set to a different value. In response to that determination, network security assessment device 115 sets threshold 135 to a different value.

In certain embodiments, network security assessment device 115 determines, based on volatility 205, that a process implemented to improve and/or maintain the security of network 110 should be redesigned. That process may have been implemented to mitigate one or more of the number of security breaches and the number of fraudulent transactions. Network security assessment device 115 may determine that a process was implemented in July of 2013. Network security assessment device 115 may determine that that process caused results 202 from July of 2013 to October of 2013 to fluctuate. Based on that determination, network security assessment device 115 may determine that the process implemented in July of 2013 should be redesigned.

In some embodiments, network security assessment device 115 may determine how frequently volatility 205 changes over a period of time. In the illustrated example of FIG. 2, network security assessment device 115 may determine that volatility 205 changed five times over a period of six months and changed only one time for the previous six-month period. The increase in the number of times volatility 205 changed over in a six-month period may indicate that number of security breaches is on the rise. Based on that information, network security assessment device 115 may further determine whether threshold 135 is set to an appropriate value, whether a process should be redesigned, and/or whether control 210 should be implemented.

In some embodiments, network security assessment device 115 may further perform one or more of McNemar's test, Cohen's Kappa test, a t-test, and a chi-squared on results 210 to determine any appropriate factor used to determine whether control 210 should be implemented, whether a process should be redesigned, and/or whether threshold 135 is set to an appropriate value.

FIG. 3 is a flowchart illustrating a method 300 for assessing network security using the system 100 of FIG. 1. In particular embodiments, network security assessment device 115 performs method 300.

Network security assessment device 115 begins by storing a first, second, third and fourth values for a metric in step 305. In step 310, network security assessment device 115 chronologically orders the first, second, third and fourth values. In step 315, network security assessment device 115 compares the first, second, third and fourth values against a threshold to produce a first, second, third and fourth results.

Network security assessment device 115 then compares the first, second, third and fourth results with each other to determine a volatility count. In step 320, network security assessment device 115 determines whether the first result is different from the second result. In step 325, network security assessment device 115 determines whether the second result is different from the third result. In step 330, network security assessment device 115 determines whether the third result is different from the fourth result. For any of these determinations, if the result is yes, network security assessment device 115 continues to step 335 to increment the volatility count.

In step 340, network security assessment device 115 determines whether a control should be implemented based on the volatility count. If the control should be implemented, network security assessment device 115 implements the control in step 345. This disclosure contemplates network security assessment device 115 implementing any appropriate control to maintain and/or improve network security. For example, network security assessment device 115 may implement a firewall and/or a filter.

In certain embodiments, by performing method 300, the security of a network may be improved and/or maintained. For example, by performing method 300, a control may be implemented that mitigates the number of security breaches. As another example, by performing method 300, a control may be implemented that mitigates the number of fraudulent transactions.

Modifications, additions, or omissions may be made to method 300 depicted in FIG. 3. Method 300 may include more, fewer, or other steps. For example, steps may be performed in parallel or in any suitable order. While discussed as network security assessment device 115 performing the steps, any suitable component of system 100, such as device 105 for example, may perform one or more steps of the method.

Although the present disclosure includes several embodiments, a myriad of changes, variations, alterations, transformations, and modifications may be suggested to one skilled in the art, and it is intended that the present disclosure encompass such changes, variations, alterations, transformations, and modifications as fall within the scope of the appended claims.

What is claimed is:
1. A network security assessment apparatus comprising:
a memory configured to store:
  a first value for a metric;
  a second value for the metric; and
  a third value for the metric, the metric indicating one or more of a number of network security breaches and a number of fraudulent transactions; and
a processor communicatively coupled to the memory, the processor configured to:
  chronologically order the first, second, and third values for the metric over a period of time;
  compare the first value against a threshold to produce a first result;
  compare the second value against the threshold to produce a second result;
  compare the third value against the threshold to produce a third result;
  if the first result is different from the second result, increment a volatility count;
  if the second result is different from the third result, increment the volatility count;
  perform one or more of McNemar's test, Cohen's Kappa test, and a chi-squared test on the first, second, and third results to produce a factor;
  determine, based on the volatility count and the factor, that a firewall or network filter should be imple- mented to mitigate one or more of the number of network security breaches and the number of fraudulent transactions; and in response to the determination that the firewall or network filter should be implemented, implement the firewall or network filter.

2. The network security assessment apparatus of claim 1, wherein the processor is further configured to:
   determine, based on the volatility count, that the threshold should be set to a different value; and
   in response to the determination that the threshold should be set to the different value, set the threshold to the different value.

3. The network security assessment apparatus of claim 1, wherein the processor is further configured to:
   determine that a process to mitigate one or more a number of network security breaches and a number of fraudulent transaction has been implemented; and
   determine, based on the volatility count and the determination that the effort has occurred, that the process should be redesigned.

4. The network security assessment apparatus of claim 1, wherein the processor is further configured to determine a proportion of the first, second, and third values that are above the threshold.

5. The network security assessment apparatus of claim 1, wherein the processor is further configured to determine a number of times the volatility count changed over the period of time.

6. The network security assessment apparatus of claim 1, wherein the processor is further configured to associate a first color with each of the first, second, and third values that is below the threshold and a second color with each of the first, second, and third values that is above the threshold.

7. A method comprising:
   storing, by a memory, a first value for a metric, a second value for the metric, and a third value for the metric, the metric indicating one or more of a number of network security breaches and a number of fraudulent transactions;
   chronologically ordering, by a processor communicatively coupled to the memory, the first, second, and third values for the metric over a period of time;
   comparing, by the processor, the first value against a threshold to produce a first result;
   comparing, by the processor, the second value against the threshold to produce a second result;
   comparing, by the processor, the third value against the threshold to produce a third result;
   if the first result is different from the second result, incrementing, by the processor, a volatility count;
   if the second result is different from the third result, incrementing, by the processor, the volatility count;
   performing one or more of McNemar's test, Cohen's Kappa test, and a chi-squared test on the first, second, and third results to produce a factor;
   determining, by the processor, based on the volatility count and the factor, that a firewall or network filter should be implemented to mitigate one or more of the number of network security breaches and the number of fraudulent transactions; and
   in response to the determination that the firewall or network filter should be implemented, implementing, by the processor, the firewall or network filter.

8. The method of claim 7, further comprising:
   determining, by the volatility count, that the threshold should be set to a different value; and
   in response to the determination that the threshold should be set to the different value, setting the threshold to the different value.

9. The method of claim 7, further comprising:
   determining that a process to mitigate one or more a number of network security breaches and a number of fraudulent transaction has been implemented; and
   determining, based on the volatility count and the determination that the effort has occurred, that the process should be redesigned.

10. The method of claim 7, further comprising determining a proportion of the first, second, and third values that are above the threshold.

11. The method of claim 7, further comprising determining a number of times the volatility count changed over the period of time.

12. The method of claim 7, further comprising associating a first color with each of the first, second, and third values that is below the threshold and a second color with each of the first, second, and third values that is above the threshold.

13. One or more computer-readable non-transitory storage media embodying software that is operable when executed to:
   store a first value for a metric, a second value for the metric, and a third value for the metric, the metric indicating one or more of a number of network security breaches and a number of fraudulent transactions;
   chronologically order the first, second, and third values for the metric over a period of time;
   compare the first value against a threshold to produce a first result;
   compare the second value against the threshold to produce a second result;
   compare the third value against the threshold to produce a third result;
   if the first result is different from the second result, increment a volatility count;
   if the second result is different from the third result, increment the volatility count;
   perform one or more of McNemar's test, Cohen's Kappa test, and a chi-squared test on the first, second, and third results to produce a factor;
   determine, based on the volatility count and the factor, that a firewall or network filter should be implemented to mitigate one or more of the number of network security breaches and the number of fraudulent transactions; and
   in response to the determination that the firewall or network filter should be implemented, implement the firewall or network filter.

14. The media of claim 13, wherein the software is further operable when executed to:
   determine, based on the volatility count, that the threshold should be set to a different value; and
   in response to the determination that the threshold should be set to the different value, set the threshold to the different value.

15. The media of claim 13, wherein the software is further operable when executed to:
   determine that a process to mitigate one or more a number of network security breaches and a number of fraudulent transaction has been implemented; and
   determine, based on the volatility count and the determination that the effort has occurred, that the process should be redesigned.

16. The media of claim 13, wherein the software is further operable when executed to determine a proportion of the first, second, and third values that are above the threshold.

17. The media of claim 13, wherein the software is further operable when executed to determine a number of times the volatility count changed over the period of time.

18. The media of claim 13, wherein the software is further operable when executed to associate a first color with each of the first, second, and third values that is below the threshold and a second color with each of the first, second, and third values that is above the threshold.

\* \* \* \* \*